3,532,793
METHOD AND COMPOSITION FOR CONTROL-
LING MICROORGANISMS CONTAINING TETRA-
HYDRO-1,3,5-THIADIAZINE-2-THIONES
Walter Traber, Riehen, Switzerland, assignor to Geigy
Chemical Corporation, New York, N.Y., a corpora-
tion of Delaware
No Drawing. Original application Dec. 27, 1966, Ser. No.
604,554, now Patent No. 3,497,506. Divided and this
application Mar. 6, 1969, Ser. No. 829,821
Claims priority, application Switzerland, Dec. 29, 1965,
18,025/65
Int. Cl. A01n 9/12, 9/120, 13/00; A61k 23/00
U.S. Cl. 424—246                                   8 Claims

ABSTRACT OF THE DISCLOSURE

Tetrahydro-1,3,5-thiadiazine-2-thiones of the formula

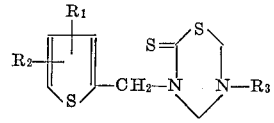

wherein $R_1$ and $R_2$ independently of each other represent hydrogen, halogen or nitro, and $R_3$ represents an unsubstituted aliphatic hydrocarbon radical or a hydrophilically substituted aliphatic hydrocarbon radical, which are useful as agents for controlling bacteria and fungi; compositions containing them and organic materials and articles of manufacture protected by these agents and compositions against attack by bacteria or fungi.

---

This application is a division of application Ser. No. 604,554, filed Dec. 27, 1966, now U.S. Pat. No. 3,497,506.

The present invention relates to new tetrahydro-1,3,5-thiadiazine-2-thiones having valuable microbicidal properties, processes for the production of these new compounds and also microbicidal compositions containing these tetrahydro-1,3,5-thiadiazine-2-thiones as active substances. It also relates to methods for controlling microorganisms and more especially fungi and bacteria, and for the protection of organic materials and articles of manufacture from attack by microorganisms using such tetrahydro-1,3,5-thiadiazine-2-thiones or compositions containing these compounds; and finally it relates to the materials and articles of manufacture protected by the novel compounds against deterioration or destruction by fungi or bacteria.

In a first aspect the invention provides for the novel tetrahydro - 1,3,5 - thiadiazine-2-thiones of the general Formula I

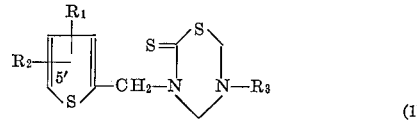

wherein $R_1$ and $R_2$ independently of each other represent hydrogen, halogen or nitro, and $R_3$ represents an unsubstituted aliphatic hydrocarbon radical or an aliphatic hydrocarbon radical substituted by a hydrophilic group as defined hereinafter, which compounds possess valuable microbicidal properties; by these properties there is understood a fungicide, bacteriostatic, fungistatic and in particular bactericidal activity. Their toxicity is slight. Thus, and because of their substantial colorlessness, the lack of irritant action on the human skin and mucous membranes, as well as because of their stability, particularly to heat and light, the new active substances can be used for the most varied purposes, e.g. for the protection of organic materials and articles of manufacture susceptible to injury and destruction by microorganisms, also as disinfectant additives to cosmetic and hygienic compositions such as soaps and other cleansing agents.

Other aspects of the invention, therefore, provide for compositions for controlling microorganisms which comprise microbicidally effective amounts of a compound falling under Formula I and a carrier which is compatible with the latter and the use of such compositions for the protection of organic materials and articles of manufacture susceptible to the attack of microorganisms, especially bacteria and fungi, as well as for methods for such control and protection for the aforesaid materials and articles of manufacture protected by effective amounts of a compound of Formula I or a composition containing the latter.

The unsubstituted or hydrophilically substituted aliphatic hydrocarbon radical $R_3$ is, preferably, a lower alkyl or alkenyl radical such as methyl, ethyl, propyl, butyl, allyl or methallyl. As hydrophilic substituents $R_3$ may contain, e.g. a hydroxyl or carboxyl group. The symbols $R_1$ and $R_2$ preferably represent halogen, particularly chlorine or bromine, also a lower alkyl radical having from 1 to 4 carbon atoms.

The new tetrahydro-1,3,5-thiadiazine-2-thiones according to the invention are produced by reacting a salt of a dithiocarbamic acid of the general Formula II

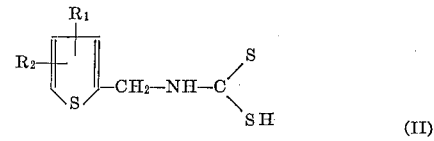

wherein $R_1$ and $R_2$ have the meanings given in Formula I, in any order desired with per mol thereof, two mols of formaldehyde and 1 mol of an amine of the general Formula III $$R_3NH_2 \qquad (III)$$

wherein $R_3$ have the meaning given in Formula I, preferably however, with an addition salt of this amine with an inorganic or organic acid. As salts of dithiocarbamic acids of Formula II, the alkali or alkaline earth salts or salts of a tertiary amine are particularly suitable. The process described is preferably performed in the presence of a solvent which is inert to the reaction components and especially in water.

According to a variation of this process, salts of dithiocarbamic acid of Formula II are first converted into the free acid and this is then reacted with 2 equivalents of formaldehyde and 1 equivalent of an amine of general Formula III.

The salts of dithiocarbamic acid of general Formula II are produced by reacting a thenylamine of Formula IV

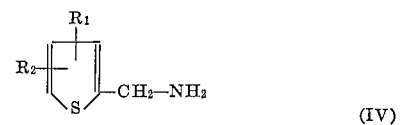

wherein $R_1$ and $R_2$ have the meaning given above with carbon disulphide in the presence of a base such as the hydroxides of alkali or alkaline earth metals, alkali carbonates or a tertiary amine. Examples of thenylamines of Formula IV are e.g. 2-thenylamine, 5-chloro-2-thenylamine, 3,5-dichloro-2-thenylamine, 4,5-dichloro-2-thenylamine, 5-bromo-2-thenylamine, 4,5-dibromo - 2 - thenylamine, 5-methyl-2-thenylamine, 5-tert. butyl-2-thenyl-amine.

The following are examples of amines of general Formula III suitable in the above-described reaction with compounds of general Formula II: methylamine, ethylamine, n-propylamine, isopropylamine, n-butylamine, isobutylamine, sec. butylamine, tert. butylamine, allylamine, ethanolamine, propanolamine, α-aminoacetic acid, β-aminopropionic acid, γ-aminobutyric acid.

The amines of general Formula III are preferably used in the aforesaid reaction in the form of their salts, for instance, their hydrochlorides, sulphates, acetates, etc. The production of tetrahydro-1,3,5-thiadiazine-2-thiones which are symmetrically or unsymmetrically substituted in the 3,5-position is known (cf. DAS 1,145,624, DAS 1,149,014, A. Rieche et al. Arch. Pharm. 296 (1963), pages 641 and 770). However, no unsymmetrically substituted tetrahydro-1,3,5-thiadiazine-2-thiones have hitherto been described which contain a five-membered heterocyclic radical bound to the 3-position on the thiadiazine-thione nucleus via an aliphatic bridging member, and which contain at the same time an aliphatic radical in the 5-position of the said nucleus.

It has now been found that in the agar incorporation test according to Leonard and Blackford J. Bact. 57, 339 (1949), which involves testing of the growth of bacteria and fungi on agar in which the active substances in various concentrations have been incorporated, the tetrahydro-1,3,5-thiadiazine-2-thiones of general Formula I show an excellent growth-inhibiting action on microorganisms such as bacteria, e.g. gram positive and gram negative bacteria, and fungi, e.g. *Aspergillus niger, Penicillium italicum, Fusarium oxysporum, Candida albincans, Acrostalagmus spec.,* etc., so that they are particularly suitable for the protection of organic materials of all types from destruction and injury by such bacteria and fungi. Also, because of their low toxicitiy to mammals, the active substances can be used in hygiene and in cosmetics. In order to protect organic materials, the active substances of general Formula I are either incorporated into the material or the material is impregnated with a solution or dispersion of the protective ingredient. In this way, keratin materials such as skins, leather, wool, and also cellulosic materials such as wood, cellulose, paper, cotton, furthermore compositions such as glues, printing thickeners made from starch and cellulose derivatives, oils of all types, processing liquors for paper and textiles, plastic and other synthetic materials of all types, can be protected from attack by such microorganisms.

For use in hygiene and as cosmetics, the active substances are incorporated into cleansing agents such as soaps and in cosmetics such as ointments, creams, deodorants. Solutions for the impregnation of material are prepared, particularly, with organic solvents such as petroleum fractions, alcohols or ethers such as ethylene glycol alkyl ether. Surfactants suitable for the protection of material such as dispersing agents and other distributing agents can be added to these solutions whereby dispersions suitable for impregnation of material to be protected are obtained. Such solutions or dispersions have a content of active substance of at least 0.1 g./litre.

In all forms for application whether intended for technical, cosmetic or hygienic purposes, the active substances of general Formula I can be used alone or together with other known microbicidal active substances. They can be combined, for example, with halogenated salicyclic acid alkylamides and anilides, with halogenated diphenyl ureas, with halogenated benzoxazoles or benzoxazolones, with polychlorohydroxydiphenyl methanes, with halogen-dihydroxydiphenyl sulphides, with halogenated hydroxydiphenyl ethers, with 2-imino-imidazolidines or -tetrahydropyrimidines or with quaternary compounds or with certain dithiocarbamic acid derivatives such as tetramethyl thiuram disulphide. Optionally, carriers which themselves have a desirable microorganism-controlling action, such as sulphur or zinc stearate, can be used as a foundation for powders or as component of ointment foundations, respectively.

The following non-limitative examples illustrate the invention further. Where not otherwise stated, parts and percentages are given by weight. The temperatures are in degrees centigrade.

EXAMPLE 1

19.4 parts of aqueous formaldehyde solution (concentration about 36% by volume) are added to a solution of sodium N-thenyl-dithiocarbamate produced from 34.4 parts of sodium carbonate, 36.6 parts of thenylamine and 24.6 parts of carbon disulphide, in 1300 parts of water. A small amount of oil which separates is filtered off, and 25.5 parts of ethylamine hydrochloride dissolved in 40 parts of water are added to the clear filtrate. The pH of the strongly alkaline solution is adjusted to 8–9 with concentrated hydrochloric acid and the solution is then stirred for 5 hours at room temperature (25°). The crystalline substance which preciciptates is filtered off under suction, dried in vacuo and recrystallised from a mixture of benzine (B.P. 80–100°) and benzene in a weight ratio of 1:2. The resulting 3-thenyl-5-ethyl-tetrahydro-1,3,5-thiadiazine-2-thione melts at 131–132°.

In using corresponding amounts of the respective thenylamine, carbon disulphide and a base in the manner described in Example I, the salts of the corresponding dithiocarbamic acid of general Formula II are produced and these salts are then reacted with formaldehyde and the hydrochloride of the corresponding amine of general Formula III to form the new tetrahydro-1,3,5-thiadiazine-2-thiones listed below.

| Ex. No. | Compound | M.P., ° |
|---|---|---|
| 2 | 3-thenyl-5-methyl-tetrahydro-1,3,5-thiadiazine-2-thione. | 120–121 |
| 3 | 3-thenyl-5-isopropyl-tetrahydro-1,3,5-thiadiazine-2-thione. | 148 |
| 4 | 3-thenyl-5-(2'-hydroxyethyl)-tetrahydro-1,3,5-thiadiazine-2-thione. | 118–119 |
| 5 | 3-thenyl-5-carboxymethyl-tetrahydro-1,3,5-thiadiazine-2-thione. | 157–159 |
| 6 | 3-(5'-chlorothenyl)-5-methyl-tetrahydro-1,3,5-thiadizaine-2-thione. | 160–161 |
| 7 | 3-(5'-chlorothenyl)-5-isopropyl-tetrahydro-1,3,5-thiadiazine-2-thione. | 94 |
| 8 | 3-(5'-chlorothenyl)-5-(2''-hydroxyethyl)-tetrahydro-1,3,5-thiadiazine-2-thione. | 97–98 |
| 9 | 3-(5'-chlorothenyl)-5-(4''-hydroxybutyl)-tetrahydro-1,3,5-thiadiazine-2-thione. | |
| 10 | 3-(5'-chlorothenyl)-5-carboxymethyl-tetrahydro-1,3,5-thiadiazine-2-thione. | 130–131 |
| 11 | 3-(3',5'-dichlorothenyl)-5-ethyl-tetrahydro-1,3,5-thiadiazine-2-thione. | |
| 12 | 3-(5'-methylthenyl)-5-allyl-tetrahydro-1,3,5-thiadiazine-2-thione. | |
| 13 | 3-(5'-ethylthenyl)-5-carboxypropoyl-tetrahydro-1,3,5-thiadiazine-2-thione. | |

The antimicrobial action of the compounds according to the invention was determined by the following test series, the degree of effectiveness of the tested compounds being given in the following table.

The antimicrobial action of some of the compounds according to the invention was tested in the following test programme, the effectiveness of the tested compounds being given in the following table:

(1) The bactericidal action was tested on the following strains of bacteria: *Staphylococcus aurous* SG 511, *Escherichia coli* NCTC 8196, *Bacillus pumilus, Sarcina ureae, Pseudomonas pyocyanea*.

The test method was the "Agar incorporation test" according to Leonard and Blackford: Nutrient agar plates with 100, 30, 10 and 3 p.p.m. of active substance (p.p.m. means parts of active substance per $10^6$ parts diluent) were inoculated with solutions of the above strains and then incubated for 2 times 24 hours at 37°. The following table shows the minimum concentrations which inhibit the growth of the individual strains:

| Compound | Staph. aureus SG 511 | E. coli- NCTC 8196 | Bac. pumi- lus | Sar. ureae | Ps. pyocya- nea |
|---|---|---|---|---|---|
| 3-thenyl-5-carboxymethyltetrahydro-1,3,5-thiadiazine-2-thione. | 100 | 100 | 100 | 100 | 100 |
| 3-(5'-chlorothenyl)-5-(2''-hydroxyethyl)-tetrahydro-1,3,5-thiadiazine-2-thione. | 30 | 100 | 100 | 100 | >100 |
| 3-(5'-chlorothenyl)-5-isopropyl-tetrahydro-1,3,5-thiadiazine-2-thione. | 30 | 100 | 30 | 100 | |

(2) The fungicidal action was tested on the following strains of fungi: *Aspergillus niger, Penicillium italicum, Fusarium oxysporum, Candida albicans, Acrostalagmus spec.*

The "Agar incorporation test" according to Leonard and Blackford was used as test method. Nutrient agar plates with 100, 30, 10 and 3 p.p.m. of active substance were inoculated with solutions of the above strains and incubated for 3 times 24 hours at 28°. The minimum concentrations which inhibit the growth of the individual strains are given in the following table:

| Compound | Asp. niger | Pen. itali- cum | Fus. oxy- sporum | Cand. albi- cans | Acr. spec. |
|---|---|---|---|---|---|
| 3-thenyl-5-carboxymethyltetrahydro-1,3,5-thiadiazine-2-thione | >100 | 10 | 100 | >100 | 10 |
| 3-(5'-chlorothenyl)-5-(2''-hydroxyethyl)-tetrahydro-1,3,5-thiadiazine-2-thione | >100 | 30 | 100 | 30 | 30 |
| 3-(5'-chlorothenyl)-5-isopropyl-tetrahydro-1,3,5-thiadiazine-2-thione | 100 | 10 | 30 | 30 | 100 |

The following non-limitative examples describe the production of various forms suitable for application in practice. The parts and percentages are given therein by weight.

EXAMPLE 14

5 parts of 3-thenyl-5-methyl-tetrahydro-1,3,5-thiadiazine-2-thione are dissolved in a solution consisting of 50 parts of dimethyl formamide and 50 parts of ethylene glycol monomethyl ether. 5000 parts of a dispersion colour containing a white pigment and copolymeric polyvinyl acetate base as binder and having about 50% solid content are added to this solution. The ready-for-use paint thus obtained, which contains 0.1% of active substance, is proof against attack by bacteria.

EXAMPLE 15

A soap is produced by mixing the following components:

| | Parts |
|---|---|
| Tallow soap | 76–76.5 |
| Active substance, e.g. 3-thenyl-5-(2'-hydroxyethyl)-tetrahydro-1,3,5-thiadiazine-2-thione | 0.5–1 |
| Coconut oil soap or palm oil soap | 15.000 |
| Free alkali (calculated as $Na_2O$) | 0.010 |
| Water | 6.065 |
| Perfume | 1.000 |
| Optical brightener | 0.200 |
| Dyestuff | 0.050 |
| Titanium white | 0.125 |
| Sequestrene ST (sodium ethylenediamine tetraacetate) | 0.050 |
| Glycerol | 0.500 |

The resulting soap has microbicidal activity.

EXAMPLE 16

0.5 part of 3-thenyl-5-isopropyl-tetrahydro-1,3,5-thiadiazine-2-thione are dissolved in 5 parts of dimethylsulphoxide and a little ethanol. This solution is diluted with 3000 parts of water which contains about 2 parts of Turkish red oil as emulsifier, and 100 parts of wool slubbing are treated in this liquor for 15 minutes at 60°. 5 parts of 10% acetic acid are added and the treatment at 60° is continued for another hour. The wool is then rinsed in the usual way and dried. On being tested, the wool is found to be resistant to attack by bacteria and fungi.

EXAMPLE 17

The following process, for example, can be used for the application of 3-thenyl-5-(2'-hydroxyethyl)-tetrahydro-1,3,5-thiadiazine-2-thione:

0.5 part of active ingredient are dissolved in 10 parts of dimethyl formamide and the solution is poured into 3000 parts of water which contains about 1–2 parts of an emulsifying agent, e.g. sulfonated castor oil.

100 parts of wool are treated in this liquor for 30 minutes at the boil. After rinsing and drying, the wool is found to be resistant to attack by bacteria and fungi.

The treatment baths in Examples III and IV may also contain other auxiliaries as well as dyestuffs.

EXAMPLE 18

First a 20% solution of 3-(5'-chloroethyl)-5-iso-propyl-tetrahydro-1,3,5-thiadiazine-2-thione in dimethyl sulphoxide is prepared. 10 parts by volume of this solution are diluted with 200 parts by volume of a solvent suitable for dry cleaning, e.g. a suitable benzine fraction ("Diluan S"). If desired, cleansing additives can be added. Woolen articles are then treated in this cleaning liquid in the usual way and then squeezed out to a content of solvent of about 100% of the weight of the wool. After drying, they are found to be resistant to attack by bacteria and fungi.

I claim:

1. A composition for controlling bacteria and fungi which comprises a bactericidally and fungicidally effective amount of a compound of the formula

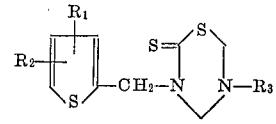

wherein $R_1$ and $R_2$ independently of each other represent hydrogen, halogen or nitro, and $R_3$ represents alkyl having 1 to 4 carbon atoms, alkenyl having 3 or 4 carbon atoms or hydrophilically substituted alkyl wherein the hydrophilic groups are hydroxyl or carboxyl and an inert carrier for said compound.

2. A composition as defined in claim 1, wherein said active ingredient is 3-thenyl-5-methyl-tetrahydro-1,3,5-thiadiazine-2-thione.

3. A composition as defined in claim 1, wherein said active ingredient is 3-thenyl-5-(2'-hydroxyethyl)-tetrahydro-1,3,5-thiadiazine-2-thione.

4. A composition as defined in claim 1, wherein said active ingredient is 3-thenyl-5-carboxymethyl-tetrahydro-1,3,5-thiadiazine-2-thione.

5. A composition as defined in claim 1, wherein said active ingredient is 3-(5'-chlorothenyl)-5-(2''-hydroxyethyl)-tetrahydro-1,3,5-thiadiazine-2-thione.

6. A composition as defined in claim 1, wherein said active ingredient is 3-(5'-chlorothenyl)-5-isopropyltetrahydro-1,3,5-thiadiazine-2-thione.

7. A method for controlling bacteria and fungi applying to said bacteria and fungi a bactericidally and fungicidally effective amount of a tetrahydro-1,3,5-thiadiazine-7-thione as defined in claim 1.

8. A method for controlling bacteria and fungi which comprises applying to said bacteria and fungi a bactericidally and fungicidally effective amount of a composition as defined in claim 1.

References Cited

UNITED STATES PATENTS 3,277,082  10/1966  Benjamin _____ 424—246 XR
3,277,087  10/1966  Fel et al. _____ 424—246 XR ALBERT T. MEIERS, Primary Examiner D. R. ORE, Assistant Examiner U.S. Cl. X.R.

106—15; 117—138.5, 142, 143, 147, 154; 252—8.57, 8.8, 47, 106

US 2318 DIV A
November 10, 1970

UNITED STATES PATENT OFFICE
CERTIFICATE OF CORRECTION

Patent No. 3,532,793      Dated October 6, 1970

Inventor(s) Walter Traber

It is certified that error appears in the above-identified patent and that said Letters Patent are hereby corrected as shown below:

Column 7, line 4: after fungi, add --which comprises--.

Column 7, line 7: "7" should read --2--.

SIGNED AND SEALED
DEC 29 1970

(SEAL)
Attest:

Edward M. Fletcher, Jr.
Attesting Officer

WILLIAM E. SCHUYLER, JR.
Commissioner of Patents